United States Patent
Carter (10) Patent No.: US 7,907,557 B2
(45) Date of Patent: Mar. 15, 2011

(54) LOW POWER RECEIVING

(75) Inventor: Trent Carter, San Jose, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 210 days.

(21) Appl. No.: 12/138,923

(22) Filed: Jun. 13, 2008

(65) Prior Publication Data

US 2009/0310618 A1 Dec. 17, 2009

(51) Int. Cl.
*G08C 17/00* (2006.01)

(52) U.S. Cl. ......... 370/311; 370/310; 370/431; 370/449; 370/450; 370/454; 340/825.26; 340/7.34; 455/343.1; 455/73; 455/550.1; 455/572; 455/574

(58) Field of Classification Search .......... 370/310, 370/311, 431–457; 340/825, 825.26, 7.32–7.38; 455/130, 334, 343.1–343.6, 73, 550.1, 572, 455/574
See application file for complete search history.

(56) References Cited

U.S. PATENT DOCUMENTS

| | | | |
|---|---|---|---|
| 6,002,918 A | | 12/1999 | Heiman et al. |
| 7,154,877 B2 * | | 12/2006 | Le et al. ............ 370/346 |
| 7,295,827 B2 * | | 11/2007 | Liu et al. .......... 455/343.2 |
| 2004/0081133 A1 * | | 4/2004 | Smavatkul et al. ...... 370/346 |
| 2004/0259542 A1 * | | 12/2004 | Viitamaki et al. ......... 455/426.2 |
| 2005/0157745 A1 * | | 7/2005 | Fujii et al. .............. 370/449 |
| 2006/0062181 A1 * | | 3/2006 | Chou ................. 370/329 |
| 2006/0109832 A1 * | | 5/2006 | Ginzburg ............ 370/346 |
| 2007/0147330 A1 * | | 6/2007 | Smith et al. .......... 370/346 |
| 2007/0147332 A1 * | | 6/2007 | Lappetelainen et al. ... 370/346 |

OTHER PUBLICATIONS

IEEE Standard for Information technology—Telecommunications and information exchange between systems—Local and metropolitan area networks—Specific requirements, Part 11: Wireless LAN Medium Access Control (MAC) and Physical Layer (PHY) Specifications, Jun. 12, 2007, IEEE Computer Society, IEEE Std. 802.11-2007.

* cited by examiner

*Primary Examiner* — William Trost, IV
*Assistant Examiner* — Charles C Jiang
(74) *Attorney, Agent, or Firm* — Thomas, Kayden, Horstemeyer & Risley, LLP (57) ABSTRACT

The disclosed methods of low power communications facilitate high speed reception of data from an access point (AP) with low transmission latencies while remaining in power save mode as long as possible. The disclosed methods allow the client to remain in a power save state and involve creating a synchronous client frame exchange with the AP that is independent of a digital traffic indication map and the AP's beacon interval. Two methods to accomplish this goal are disclosed: one which involves sending PS Poll Frames; and one that includes fast CAM switching, both at a self tuning frequency.

16 Claims, 6 Drawing Sheets

LOW POWER RECEIVING

TECHNICAL FIELD

The present disclosure is generally related to communications and, more particularly, is related to systems and methods for low power communications.

BACKGROUND

Communication networks come in a variety of forms. Notable networks include wireline and wireless. Wireline networks include local area networks (LANs), DSL networks, and cable networks, among others. Wireless networks include cellular telephone networks, classic land mobile radio networks and satellite transmission networks, among others. These wireless networks are typically characterized as wide area networks. More recently, wireless local area networks and wireless home networks have been proposed, and standards, such as Bluetooth and IEEE 802.11, have been introduced to govern the development of wireless equipment for such localized networks.

A WLAN typically uses infrared (IR) or radio frequency (RF) communications channels to communicate between portable or mobile computer terminals and stationary access points or base stations. These access points are, in turn, connected by a wired or wireless communications channel to a network infrastructure which connects groups of access points together to form the LAN, including, optionally, one or more host computer systems.

Wireless protocols such as Bluetooth and IEEE 802.11 support the logical interconnections of such portable roaming terminals having a variety of types of communication capabilities to host computers. The logical interconnections are based upon an infrastructure in which at least some of the terminals are capable of communicating with at least two of the access points when located within a predetermined range, each terminal being normally associated, and in communication, with a single one of the access points. Based on the overall spatial layout, response time, and loading requirements of the network, different networking schemes and communication protocols have been designed so as to most efficiently regulate the communications.

IEEE Standard 802.11 ("802.11") is set out in "Wireless LAN Medium Access Control (MAC) and Physical Layer (PHY) Specifications" and is available from the IEEE Standards Department, Piscataway, N.J. 802.11 permits either IR or RF communications at 1 Mbps, 2 Mbps and higher data rates, a medium access technique similar to carrier sense multiple access/collision avoidance (CSMA/CA), a power-save mode for battery-operated mobile stations, seamless roaming in a full cellular network, high throughput operation, diverse antenna systems designed to eliminate "dead spots," and an easy interface to existing network infrastructures.

As communication devices become smaller, while providing increasing functionality, addressing the receive portion of wireless transmission without limiting receive throughput while facilitating multiple packet receives raises significant design challenges. Thus, a heretofore unaddressed need exists in the industry to address the aforementioned deficiencies and inadequacies.

SUMMARY

Embodiments of the present disclosure provide systems and methods for low power communications.

Briefly described, in architecture, one embodiment of the system, among others, can be implemented as follows: a processor in a station configured to: receive a data frame from an access point; poll synchronously to determine if more data frames for the station are buffered at the access point; if more data frames for the station are not buffered at the access point, determine if a poll timer value is less than a target beacon transmission time; if the poll timer value is less than the target beacon transmission time, adjust a poll interval value; cause the station to enter sleep mode; and delay for a time substantially equal to the poll interval value before waking up from the sleep mode.

Embodiments of the present disclosure can also be viewed as providing methods for low power communications. In this regard, one embodiment of such a method, among others, can be broadly summarized by the following steps: receiving a data frame at a station from an access point; polling synchronously to determine if more data frames for the station are buffered at the access point; if more data frames for the station are not buffered at the access point, determining if a poll timer value is less than a target beacon transmission time; if the poll timer value is less than the target beacon transmission time, adjusting a poll interval value; entering sleep mode; and delaying for a time substantially equal to the poll interval value before waking up from the sleep mode.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are various communication system and method embodiments. Such a communication system comprises, in one exemplary embodiment, an access point and one or more client devices that enable low power communications. To preserve battery life on portable WLAN clients the 802.11 specification provides for power save operations on client devices. Power save operations may be performed in any type of processor such as a MAC layer processor (though not limited to a MAC layer processor), including, but not limited to, a digital signal processor (DSP), a microprocessor unit (MCU), a general purpose processor, and an application specific integrated circuit (ASIC), among others. Because certain embodiments of communication systems with low power communications are described herein in the context of an 802.11n system, a brief description of 802.11 and layers in a wireless LAN (WLAN) follows with the understanding that the disclosed systems and methods may similarly apply to other communications systems.

IEEE 802.11n (the "802.11n proposal") is a high data rate extension of the 802.11a standard at 5 gigahertz (GHz) and 802.11g at 2.4 GHz. Both of these standards use orthogonal frequency division multiplexing (OFDM), which is a signaling scheme which uses multiple, parallel tones to carry the information. These tones are commonly called subcarriers. It is noted that, at the present time, the 802.11n proposal is only a proposal and is not yet a completely defined standard. Other applicable standards include Bluetooth, xDSL, other sections of 802.11, etc. To increase the data rate, 802.11n is considering using a more PSMP indication.

IEEE 802.11 is directed to wireless LANs, and in particular specifies the MAC and the PHY layers. These layers are intended to correspond closely to the two lowest layers of a system based on the ISO Basic Reference Model of OSI, i.e., the data link layer and the physical layer.

Figure 1:
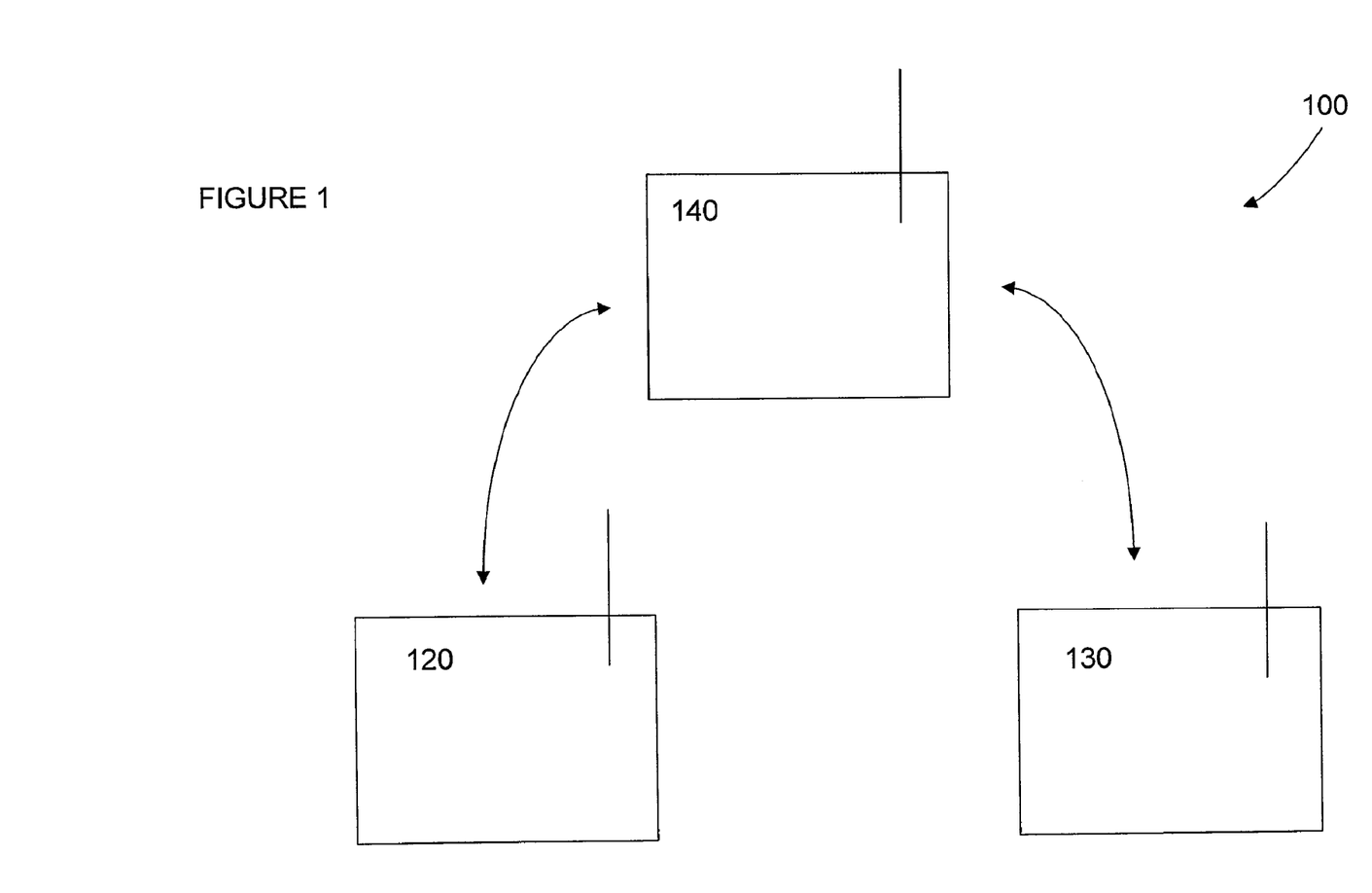
FIG. 1 is a block diagram of an example embodiment of a system of low power communications.

This OSI model can be useful for transmissions between, for example, two stations, 120, 130 as shown in FIG. 1 and an access point (AP) 140. An embodiment of a communication system 100 is shown that provides for low power communications, and, in one embodiment, is configured as a wireless ad hoc network (IBSS). An IBSS is a group of 802.11 stations such as stations 120, 130 communicating with one another. Stations 120, 130 of communication system 100 may comprise transceivers for transmitting and receiving data streams between stations 120, 130, and may include multiple antennas for receiving and/or transmitting. Stations 120, 130 may comprise two client stations or a client station and an AP 140. Stations 120, 130 do not necessarily have the same number of antennas. Stations 120, 130 may transmit using, as non-limiting examples, a time division multiple access (TDMA) protocol or a Carrier Sense Multiple Access with Collision Avoidance (CSMA/CA) protocol, or a combination of the same and/or other protocols. Although only two stations are provided in this example, the disclosed principles of transmission announcement indication are also applicable to larger networks with more devices. Certain embodiments of the transmission announcement indication systems and methods may also be implemented as a basic service set (BSS). A BSS is a group of 802.11 stations with a central access point (AP). An AP may be the central access point for a plurality of stations in a BSS.

In some embodiments, each station 120, 130 comprises a PHY signal processor configured to implement communications operations, in addition to performing low power communications. That is, each PHY signal processor, alone, or in combination with other logic or components, implements the functionality of the various embodiments. Functionality of low power communications systems and methods may be embodied in a wireless radio, or other communication device. Such a communication device may include many wireless communication devices, including computers (desktop, portable, laptop, etc.), consumer electronic devices (e.g., multimedia players), compatible telecommunication devices, personal digital assistants (PDAs), or any other type of network devices, such as printers, fax machines, scanners, hubs, switches, routers, set-top boxes, televisions with communication capability, etc.

In one embodiment, low power communications is a synchronous polling power save mode designed to reduce power consumption in 802.11 clients by increasing the maximum throughput the client can receive without leaving power save and reducing the received power in that range. The primary goals are to reduce the power and increase receive throughput within power save mode while remaining fully 802.11 and WiFi compliant. The access point will not need to be aware of this new client power save mode.

Example embodiments will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

The logic of the example embodiments of this disclosure can be implemented in hardware, software, firmware, or a combination thereof. In example embodiments, the logic is implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments of the present disclosure in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of the present disclosure includes embodying the functionality of the example embodiments of the present disclosure in logic embodied in hardware or software-configured mediums.

Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved, as would be understood by those reasonably skilled in the art. In addition, the process descriptions or blocks in flow charts should be understood as representing decisions made by a hardware structure such as a state machine known to those skilled in the art.

Referring to FIG. 1, in one embodiment, a power save (PS) operation may involve client station 120, for example, entering low power mode by turning off the client station transceiver. Access point (AP) 140 buffers frames addressed to client station 120 while client station 120 is in power save mode. At a given interval, client station 120 wakes up and listens for a beacon from AP 140 indicating whether frames are buffered for client station 120.

A multi-poll solution is a channel access mechanism in which a poll is sent to multiple client stations 120, 130 at once using a broadcast or multicast receiver address, instead of to each client station 120, 130 individually, (e.g., instead of sequentially). A multi-poll solution may include a time slot for each polled client station 120, 130 during which they should transmit and/or receive. In other words, multi-poll AP 140 polls multiple client stations at once. Multicast/broadcast power save operations may use an AP-defined interval, which is advertised in the beacons of AP 140. For instance, client station 120 wakes up and listens to the beacon frames to determine whether frames are buffered. If AP 140 has indeed buffered frames for client station 120, client station 120 polls AP 140 for the frames. If AP 140 has not buffered frames, client station 120 returns to low-power mode until the wake-up interval.

When client station 120 associates to AP 140, in broadcast operation, an administrator specifies a listen interval value in an association request frame. The listen interval is the number of beacons client station 120 waits before transitioning to active-mode. For example, a listen interval of 200 indicates that client station 120 wakes up from power save mode every 200 beacons. The beacon frame includes a traffic indication map (TIM) information element. The element contains a list of all association identifiers (AIDs) that have traffic buffered at AP 140. In one embodiment, there may be 2,008 unique AIDs, so the TIM element alone may be up to 251 bytes.

To minimize network overhead, the TIM may utilize a shorthand method of listing the AIDs. The AID of client station 140 is not explicitly stated in a protocol decoding operation. To determine the AID of client station 120, non-limiting examples of the following information may be used: a value of a link field, a value of a bit map offset field, and/or a value of a partial virtual bit map field. IEEE 802.11 specifies a traffic indication virtual bit map as a mechanism to indicate which client station AIDs have frames buffered. In one embodiment, the virtual bit map spans from AID1 to AID2007. AID0 is reserved for multicast/broadcast. Additionally, a special TIM information element known as a digital traffic indication map (DTIM), indicates whether broadcast or multicast traffic is buffered at AP 140.

A partial virtual bit map may eliminate unnecessary zero flag values by summarizing them. All client stations 120, 130 that have frames buffered (and therefore have flag values of 1 in the traffic indication virtual bit map) are included in the partial virtual bit map. All AIDs with the flag value of zero leading up to the partial virtual bit map may be summarized by a derived value referred to as "x". Client station 120 may send a PS-poll frame to AP 140 to request any buffered frames on AP 140. AP 140 responds to the PS-poll frame with one of the client station's buffered frames and an indication of whether more frames are buffered.

Broadcast and multicast frames are buffered for all client stations (including non-power save client stations) in the communication system 200 when one or more power save client stations is associated to AP 140. In one embodiment, the TIM has two fields to indicate whether multicast/broadcast traffic is buffered and how long until the buffered traffic is delivered to the BSS: the DTIM count field and the DTIM period field. The DTIM count field indicates how many beacons until the delivery of the buffered frames. A value of zero may indicate that the TIM is a DTIM and if there are buffered frames, they will be transmitted immediately following the beacon. The DTIM period field may indicate the number of beacons between DTIMs. For example, a value of 10 indicates that every tenth beacon will contain a DTIM.

In IEEE802.11 wireless networks, where clients are battery-powered, disclosed methods to save power include IEEE802.11 power save mode and automatic power save delivery (APSD). IEEE802.11 power save mode does not adequately address the receive portion of the transmission because it limits receive throughput and does not facilitate multiple packet receives. APSD addresses these issues in various ways, but it is not common among installed access points and thus will not be a viable solution for years to come.

Figure 2:
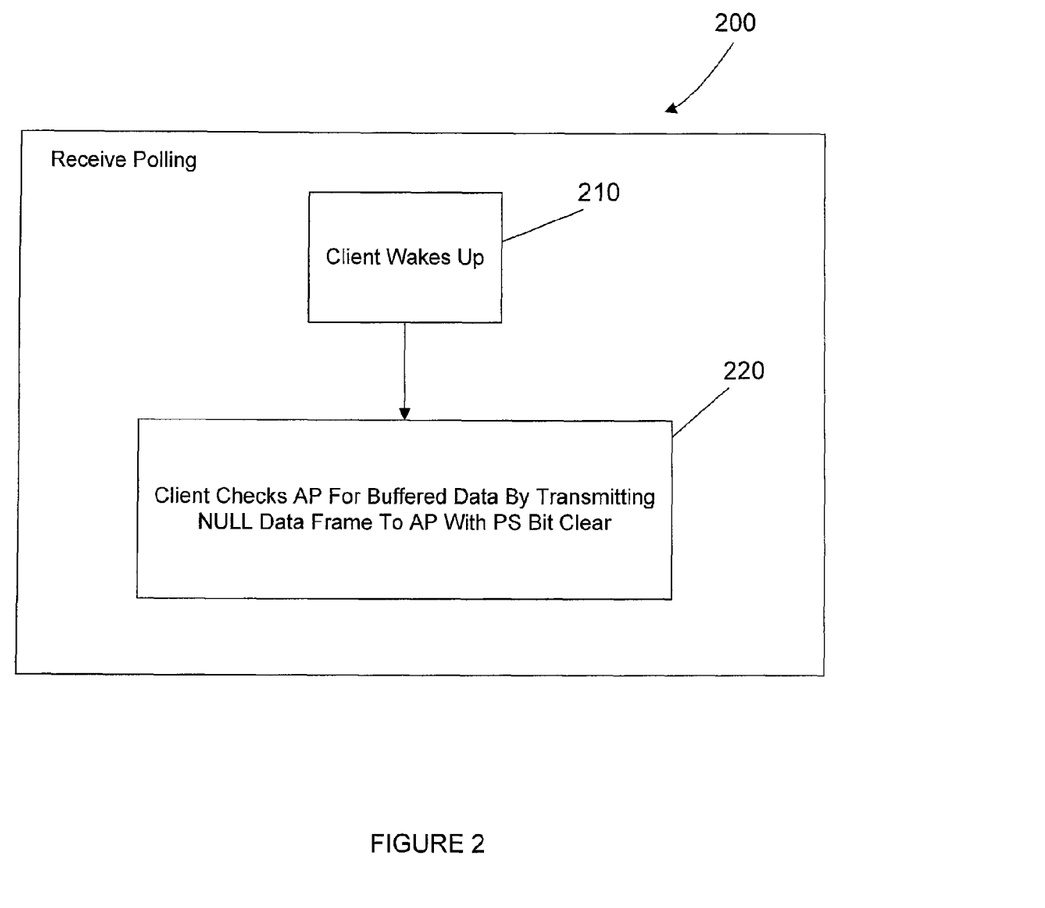
FIG. 2 is a flow chart of an example method of receive polling using the system of FIG. 1.

In an example embodiment of method of low power communications 200 provided in FIG. 2, the client polls to determine if there are any packets that are buffered for the client. In block, 210, the client makes up from sleep mode. This may involve the client waking up from its low power sleep mode for delivery traffic information message (DTIM) and receiving the beacon from the AP. The TIM (Traffic Indication Map) field of the beacon tells the client that there is broadcast, multicast, or unicast data waiting for the client at the AP and that the client needs to facilitate receiving it. In block 220, the client may determine if there is data waiting at the access point (AP) before it will attempt to receive data. To determine of data is waiting, the client may check the AP for buffered data by transmitting a NULL data frame to the AP with a PS bit cleared. In the 802.11 standards based power save mode, the client has two options to receive data frames from the access point: PS Poll Method and switching the client from power save mode to constantly awake mode (CAM) and staying in CAM until all of the data is downloaded from the AP's buffers or a pre-specified time out has occurred.

In the PS Poll Method, the client stays asleep most of the time and only wakes up to poll the data from the AP at DTIM when the client's TIM is set in the beacon. This method may be effective for low data rates and they let the client return to sleep very fast. This method can only deliver a finite amount of throughput from the AP because all of the frames from the beacon (usually 100 milliseconds) must be buffered and individually polled from the AP frame by frame. The operational limit for this type of polling may be less than 4 MBPS for 802.11a and 802.11g. This may also be an issue for 802.11b and 802.11n.

In the second generally accepted method to receive data from the AP after DTIM, the client switches from power save mode to constantly awake mode (CAM) and stays in CAM until all of the data is downloaded from the AP's buffers or a pre-specified time out has occurred.

An issue that is not addressed with these two methods is that the mechanism used to notify the client that there are frames waiting at the AP is based on the AP's DTIM, which is a minimum of 100 milliseconds in most cases and can easily be approximately 600 milliseconds. Thus, the client may download one AP buffer unit every DTIM interval. This presents a limit on the throughput that the client can download while it is in PSM.

Example disclosed methods of low power communications facilitate high speed reception of data from the AP while remaining in power save mode. Example methods used to solve this receive throughput limit while allowing the client to remain in a power save state may involve creating a synchronous client frame exchange with the AP that is independent of DTIM and the AP's beacon interval. For example, with VoIP traffic, one frame may be sent on a downstream link and one frame may be sent on an upstream link every 20 or 30 mS depending on VoIP codec. Thus, if the Client knows that it needs to receive one frame every 30 mS, it can wake up and transmit a PS-POLL to the AP without receiving a beacon. Waiting for the beacon is unnecessary because it is known that there is data waiting, and the data may be time critical. The synchronicity used is application dependent. Two example systems that use synchronicity are VoIP and two-way video conferencing. Two example methods to accomplish this goal include: one which involves sending PS Poll Frames; and one that includes fast CAM switching, both at a self tuning frequency.

Figure 3:
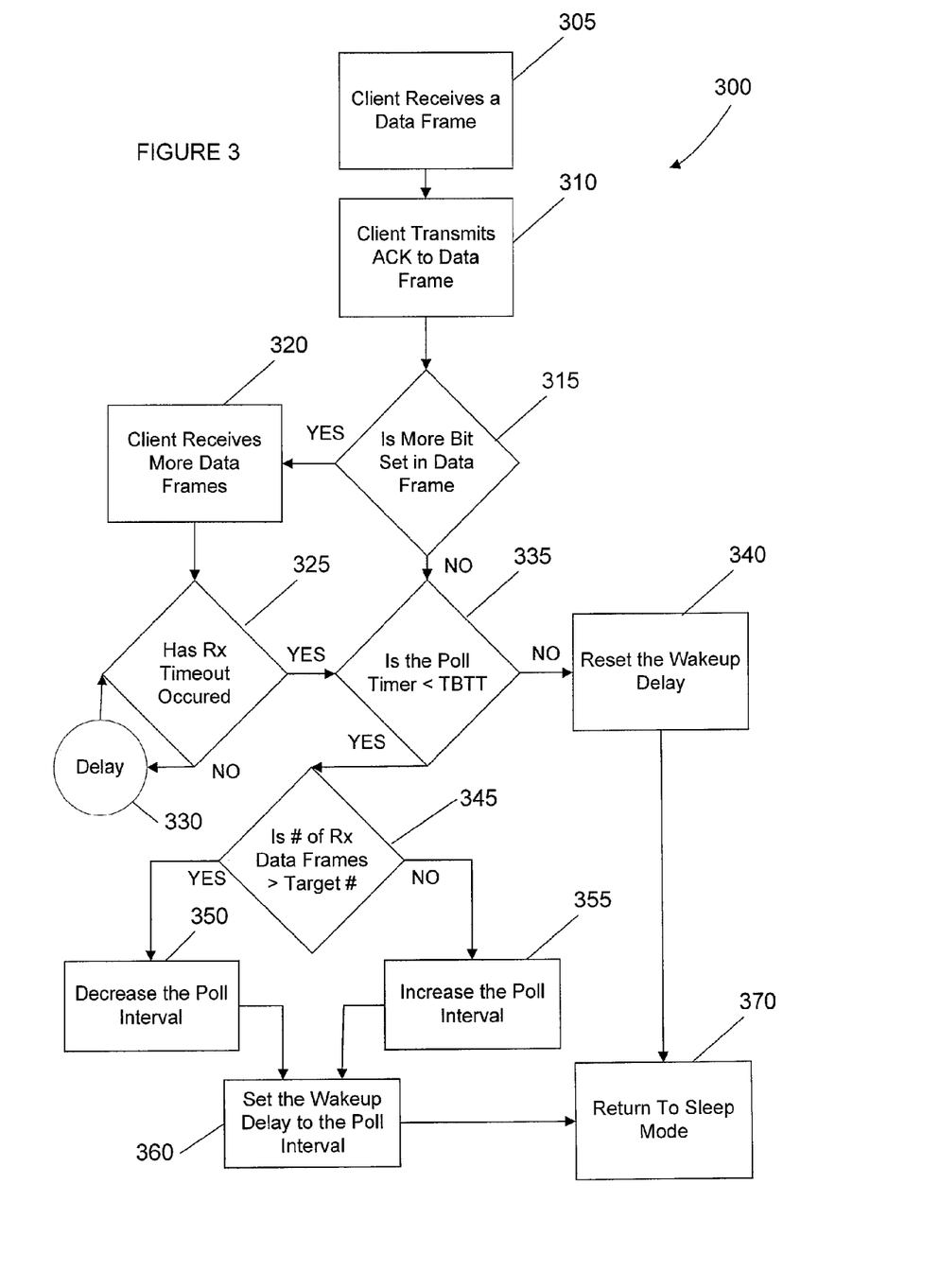
FIG. 3 is a flow chart of an example method of low power communications using the system of FIG. 1.

In the first method as provided in FIG. 3, the client may initiates synchronous polling of the AP method (poll interval algorithm 300) using synchronous fast CAM polling with a self tuning frequency. The client will wake up every poll interval to check the AP for buffer data. The polling mechanism will consist of the client transmitting a null data frame to the AP with the PSM bit equal to zero as described in FIG. 2. This indicates to the AP that the client is no longer in power save mode and is waiting for any data stored in the AP's buffers. The AP will then transmit any buffer data. After the buffer data has been transmitted or after a client time out, the client will send another null data frame with the PSM bit equal to one, indicating to the AP that the client is in PSM mode and to buffer all frames for the client until it requests them. This poll interval will vary based on how often frames are waiting at the AP for the client as described in FIG. 3. In an example embodiment, the poll interval may be limited by either a preset minimum poll interval value, a preset maximum poll interval value, neither, or both.

In block 305, a client receives a data frame. In block 310, the client transmits an acknowledgement frame (ACK) in response to a received data frame. In block 315, the client determines whether the MORE bit is set to 1 in the received data frame. If the MORE bit is set to 1, in block 320, the client receives more data frames. Then, in block 325, the client determines whether a receive timeout has occurred. The receive timeout may be set at the client to ensure that the client will return to low power mode if the AP fails to send a data frame as it should. If a receive timeout has not occurred, in block 330, the client delays for a time period (for example, 1 msec) and then again checks for a receive timeout. This is repeated until a timeout occurs. When a receive timeout occurs, the method moves to block 335. Block 335 is also encountered if, in block 315, the client determines that the MORE bit in the received data frame is set to 0. In block 335, the client determines whether the poll timer value is less than a target beacon transmission time (TBTT). If the poll time is not less than TBTT, in block 340, a wakeup delay is reset and, in block 370, the client returns to sleep mode. If, in block 335, the poll timer is determined to be less than TBTT, in block 345, the number of received data frames is compared to a target number of received frames. The target number may be application specific. For simple VoIP the target number may be a single frame. For video conferencing, for example, the target number may be two or three frames. This may be set at the client by the application layer. If the received number of frames is greater than the target number, in block 350, the poll interval is decreased by one. If the received number of frames is not greater than the target number, in block 355, the poll interval is increased. In block 360, the wakeup delay is set to the poll interval value, and, in block 370, the client returns to sleep mode.

Poll interval algorithm 300 maintains the number of frames at the AP within a transport control protocol (TCP) window, thus optimizing wake up events by downloading as many frames as possible. If a client device were to just receive one frame for every wake up event, the system would be much less efficient because the wake up overhead would not be averaged into multiple frames.

Figure 4:
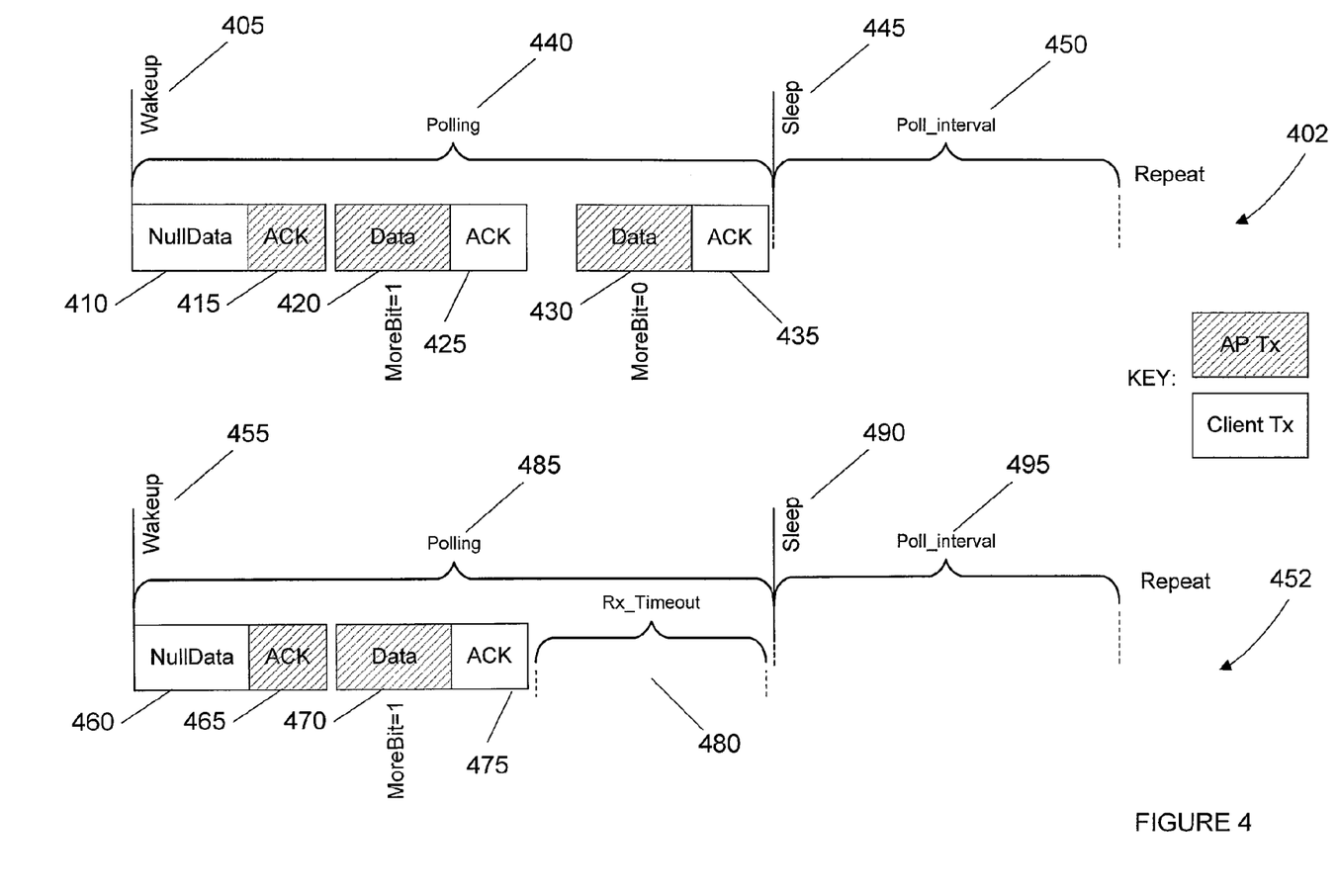
FIG. 4 is a timing diagram of an example packet transmission using the method of FIG. 3.

The frames may be initiated by the client every poll interval as illustrated in FIG. 4. In example transmission sequence 402, the client wakes up at point 405, at which point the client enters polling period 440. At the beginning of polling period 440, the client sends NULL packet 410, and the AP replies with ACK packet 415. The AP sends data packet 420 with MORE bit set to 1. When the client receives data packet 420 with MORE bit set to 1, the client sends ACK packet 425 and waits to receive more packets. In this example embodiment, the AP sends another data packet 430, but this time the MORE bit is set to 0. The client sends ACK packet 435. Since the MORE bit was set to 0, the client determines that the AP has no more packets buffered for the client, and, at point 445, the polling period ends and the client enters sleep mode. The client then waits for poll interval 450, and the sequence is repeated.

In example transmission sequence 452, the client wakes up at point 455, at which point the client enters polling period 485. At the beginning of polling period 485, the client sends NULL packet 460, and the AP replies with ACK packet 465. The AP sends data packet 470 with MORE bit set to 1. When the client receives data packet 470 with MORE bit set to 1, the client sends ACK packet 475 and waits to receive more packets. In this example embodiment, the client receives no more packets for receive timeout period 480. Since receive timeout period 480 is reached with no more packets received, at point 490, the polling period ends and the client enters sleep mode. The client then waits for poll interval 495, and the sequence is repeated.

Figure 5:
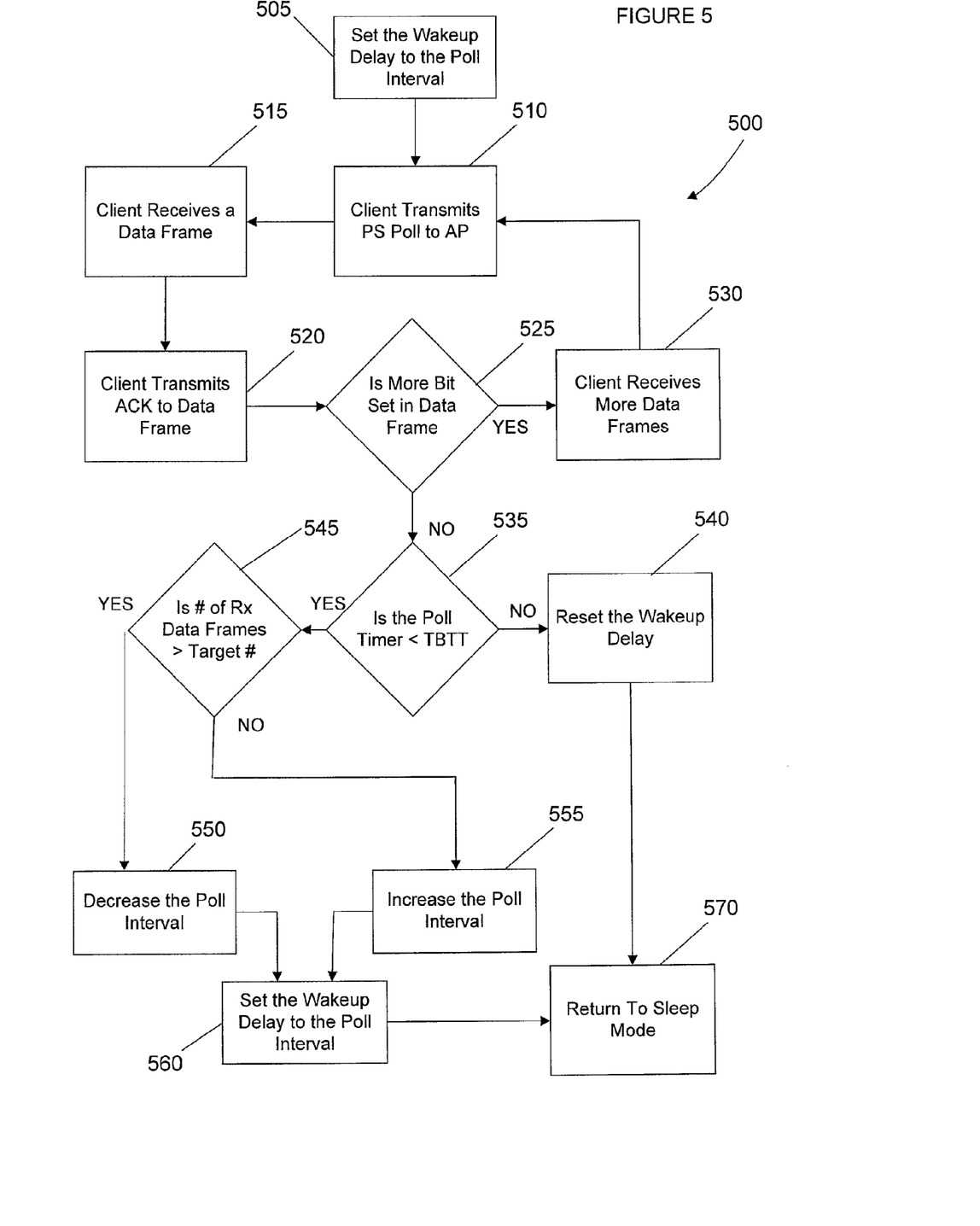
FIG. 5 is a flow chart of an example method of low power communications using the system of FIG. 1.

A second method for this low power communications involves using synchronous PS-Poll Based polling with a self tuning frequency as provided in fast cam algorithm 500 provided in FIG. 5. In block 505, the wakeup delay is set to the poll interval. The client will periodically wake up from the sleep portion of TSM every poll interval (in milliseconds 1-254). During the wakeup, in block 510, the client sends a PS poll to the AP to retrieve data. In block 515, the client receives a data frame. In block 520, the client transmits an ACK packet in response to receiving the data frame. In bock 525, the client checks the MORE bit of the data frame. If the MORE bit is set to 1, in block 530, the client receives more data frames and fast cam algorithm 500 returns to block 510. This process may be repeated until the AP indicates that all data is received by clearing the MORE bit. When, in block 525, the client determines that the MORE bit is set to 0, the client returns to sleep mode until the next poll interval or TBTT event occurs by comparing the poll timer to TBTT in block 535. If the poll timer is not less than TBTT, the wakeup delay is reset in block 540 and the client returns to sleep mode in block 570. After a TBTT wakeup, the poll interval timer will be reset, making the next wakeup from the poll interval equal to TBTT+the poll interval.

If, in block 535, the poll timer is less than TBTT, in block 545, the number of received data frames is compared to a target number of frames. If the number of received data frames is greater than the target number of frames, the poll interval is decreased in block 550. If the number of received data frames is not greater than the target number of frames, the poll interval is increased in block 555. In block 560, the wakeup delay is set to the poll interval and the client returns to sleep mode in block 570. This poll interval will vary based on how often frames are waiting at the AP from the client. In an example embodiment, the poll interval may be limited by either a preset minimum poll interval value, a preset maximum poll interval value, neither, or both.

Figure 6:
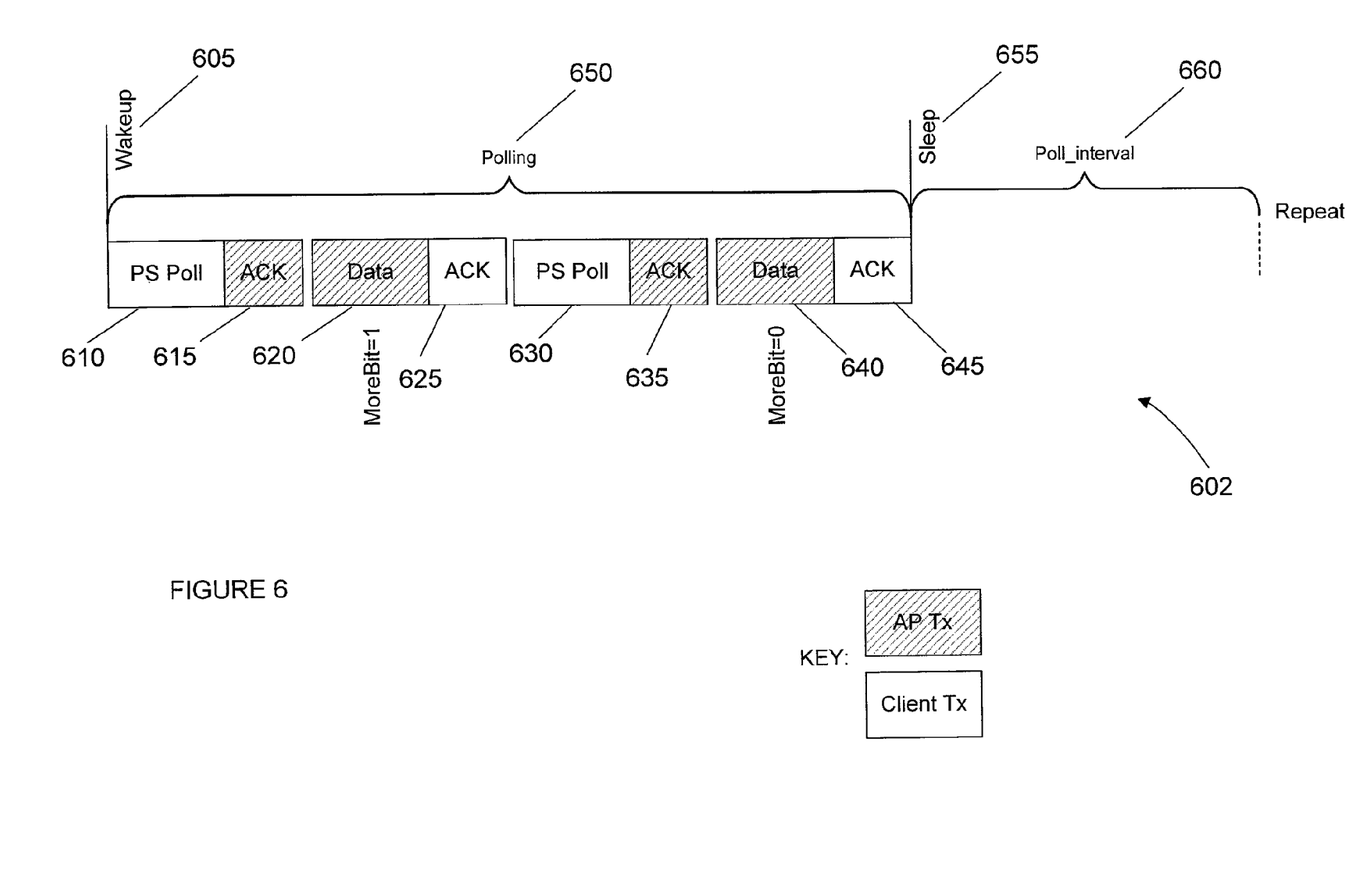
FIG. 6 is a timing diagram of an example packet transmission using the method of FIG. 5.

The corresponding frames are provided in transmission sequence 602 of FIG. 6. In example transmission sequence 602, the client wakes up at point 605, at which point the client enters polling period 650. At the beginning of polling period 650, the client sends PS Poll packet 610, and the AP replies with ACK packet 615. The AP sends data packet 620 with MORE bit set to 1. When the client receives data packet 620 with MORE bit set to 1, the client sends ACK packet 625. Since the MORE bit of data packet 620 is set to 1, the client sends PS Poll packet 630, and the AP replies with ACK packet 635. In this example embodiment, the AP sends data packet 640, but with MORE bit set to 0. When the client receives data packet 640 with MORE bit set to 0, the client sends ACK packet 645. Since the MORE bit of data packet 640 is set to 0, at point 655, the polling period ends and the client enters sleep mode. The client then waits for poll interval 660, and the sequence is repeated.

The results indicate that the maximum throughput received during standard spaced PSM is 5 megabits per second. This can be increased to almost 15 megabits per second with synchronous PS-Poll or fast cam polling. With either of the synchronous polling methods with the automatic tuning system the maximum throughput can be increased for receiving data during power save mode by 300% from 5 megabits per second to 15 megabits per second and the current consume can be reduced during the transfer substantially.

Synchronous polling with PS polls or fast cam polls increases the maximum throughput that can be attained during PSM mode and reduces the power consumption in that range for all WiFi modulations. The systems and methods of low power communications disclosed herein may affect power consumption such that the power consumption of transmitting and receiving are substantially symmetrical. This technology is beneficial for battery powered devices that download data at high data rates (as a non limiting example, data rates greater than 5 megabits per second). The systems and methods of low power communications disclosed herein may create an automatic PSM mode where the host does not have to manually switch between modes.

The flow chart of FIGS. 2, 3, and 5 show the architecture, functionality, and operation of a possible implementation of the low power communications software. In this regard, each block represents a module, segment, or portion of code, which comprises one or more executable instructions for implementing the specified logical function(s). It should also be noted that in some alternative implementations, the functions noted in the blocks may occur out of the order noted in FIGS. 2, 3, and 5. For example, two blocks shown in succession in FIGS. 2, 3, and 5 may in fact be executed substantially concurrently or the blocks may sometimes be executed in the reverse order, depending upon the functionality involved, as will be further clarified hereinbelow.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and to be protected by the following claims.

Therefore, at least the following is claimed:

1. A method implemented in a station, the method comprising:
   receiving a data frame at a station from an access point;
   polling synchronously, at the station, to determine if more data frames for the station are buffered at the access point, wherein polling synchronously comprises polling with a power save poll message;
   if more data frames for the station are not buffered at the access point, determining if a poll timer value is less than a target beacon transmission time;
   if the poll timer value is less than the target beacon transmission time, adjusting a poll interval value;
   entering sleep mode; and
   delaying for a time substantially equal to the poll interval value before waking up from the sleep mode;
   if the poll timer value is not less than the target beacon transmission time,
   resetting the wakeup delay; and
   returning to sleep mode.

2. The method of claim 1, wherein polling synchronously comprises:
   constantly awake mode polling by sending a null data packet to the access point to indicate that the station is ready to receive a data frame.

3. The method of claim 2, further comprising:
   if more data frames for the station are buffered at the access point, receiving the data frames;
   determining whether a receive timeout occurred;
   if the receive timeout has occurred, then determining if the poll timer value is less than the target beacon transmission time; and
   if the receive timeout has not occurred, then delaying for a delay period and repeating the step of determining if the receive timeout has occurred.

4. The method of claim 2, wherein if the poll timer value is less than the target beacon transmission time, adjusting the poll interval value further comprises:
   determining if a number of received data frames is greater than a target number;
   decreasing the poll interval value if the number of received data frames is greater than the target number;
   increasing the poll interval value if the number of received data frames is not greater than the target number; and
   setting a wakeup delay to the poll interval value.

5. The method of claim 2, wherein if the poll timer value is not less than the target beacon transmission time, resetting the wakeup delay; and
   returning to sleep mode.

6. The method of claim 1, wherein the determining if more data for the station is buffered at the access point comprises checking the MORE bit of the data frame.

7. The method of claim 1, further comprising:
   if more data frames for the station are buffered at the access point, receiving the data frames;
   transmitting a power save poll message;
   receiving a data frame; and
   transmitting an acknowledgement frame in response to receiving the data frame.

8. The method of claim 1, wherein if the poll timer value is less than the target beacon transmission time, adjusting a poll interval value further comprises:
 determining if a number of received data frames is greater than a target number;
 decreasing the poll interval value if the number of received data frames is greater than the target number;
 increasing the poll interval value if the number of received data frames is not greater than the target number; and
 setting a wakeup delay to the poll interval value.

9. A system comprising:
 a processor in a station configured to:
  receive a data frame from an access point;
  poll synchronously to determine if more data frames for the station are buffered at the access point;
  if more data frames for the station are not buffered at the access point, determine if a poll timer value is less than a target beacon transmission time;
  if the poll timer value is less than the target beacon transmission time, adjust a poll interval value;
  cause the station to enter sleep mode;
  delay for a time substantially equal to the poll interval value before waking up from the sleep mode;
  send a null data frame to the access point to indicate that the station is ready to receive data;
  if more data frames for the station are buffered at the access point, receive the data frames;
  determine whether a receive timeout occurred;
  if the receive timeout has occurred, then determine if the poll timer value is less than the target beacon transmission time; and
  if the receive timeout has not occurred, then delay for a delay period and repeat the determination of whether the receive timeout has occurred.

10. The system of claim 9, wherein the processor is further configured to:
 synchronously poll for a data frame residing in a buffer by sending a power save poll message.

11. The system of claim 10, wherein the processor is further configured to:
 if more data frames for the station are buffered at the access point, receive the data;
 transmit a power save poll message;
 receive a data frame; and
 transmit an acknowledgement frame in response to receiving the data frame.

12. A system comprising:
 means for receiving a data frame from an access point;
 means for polling synchronously to determine if more data frames for a station are buffered at the access point, wherein means for polling synchronously comprises means for polling with a power save poll message;
 means for, if more data frames for the station are not buffered at the access point, determining if a poll timer value is less than a target beacon transmission time;
 means for, if the poll timer value is less than the target beacon transmission time, adjusting a poll interval value;
 means for causing the station to enter sleep mode; and
 means for delaying for a time substantially equal to the poll interval value before waking up from the sleep mode;
 means for, if the poll timer value is not less than the target beacon transmission time, resetting the wakeup delay; and
 means for returning to sleep mode.

13. The system of claim 12, further comprising:
 means for sending a null data frame to the access point to indicate that the station is ready to receive a data frame.

14. The system of claim 13, further comprising:
 means for, if more data frames for the station are buffered at the access point, receiving the data;
 means for determining whether a receive timeout occurred;
 means for, if the receive timeout has occurred, then determining if the poll timer value is less than the target beacon transmission time; and
 means for, if the receive timeout has not occurred, then delaying for a delay period and repeating the determination of whether the receive timeout has occurred.

15. The system of claim 12, further comprising means for synchronously polling for buffered data packets with a power save poll message.

16. The system of claim 15, further comprising:
 means for, if more data frames for the station are buffered at the access point, receiving the data;
 means for transmitting a power save poll message;
 means for receiving a data frame; and
 means for transmitting an acknowledgement frame in response to receiving the data frame.

* * * * *

UNITED STATES PATENT AND TRADEMARK OFFICE
CERTIFICATE OF CORRECTION

PATENT NO.        : 7,907,557 B2
APPLICATION NO.   : 12/138923
DATED             : March 15, 2011
INVENTOR(S)       : Trent Carter It is certified that error appears in the above-identified patent and that said Letters Patent is hereby corrected as shown below:

Column 5, line 47: "station 140" should be replaced with "station 120"

Column 6, line 5: "system 200" should be replaced with "system 100"

Column 7, line 25: "initiates" should be replaced with "initiate"

Column 9, line 53: "The flow chart" should be replaced with "The flow charts"

Column 10, claim 1, line 12: "at a station" should be replaced with "at the station"

Column 10, claim 6, line 60: "checking the MORE" should be replaced with "checking a MORE"

Column 10, claim 7, line 64: "transmitting a power" should be replaced with "transmitting the power"

Column 11, claim 8, line 2: "adjusting a poll" should be replaced with "adjusting the poll"

Column 11, claim 11, line 44: "transmit a power" should be replaced with "transmit the power"

Column 12, claim 15, line 36: "with a power" should be replaced with "with the power"

Column 16, claim 16, line 40: "transmitting a power" should be replaced with "transmitting the power"

Signed and Sealed this
Sixth Day of December, 2011

David J. Kappos
*Director of the United States Patent and Trademark Office*